Oct. 29, 1940. H. A. SMITT 2,219,965
TRANSMISSION MECHANISM
Filed Dec. 23, 1938
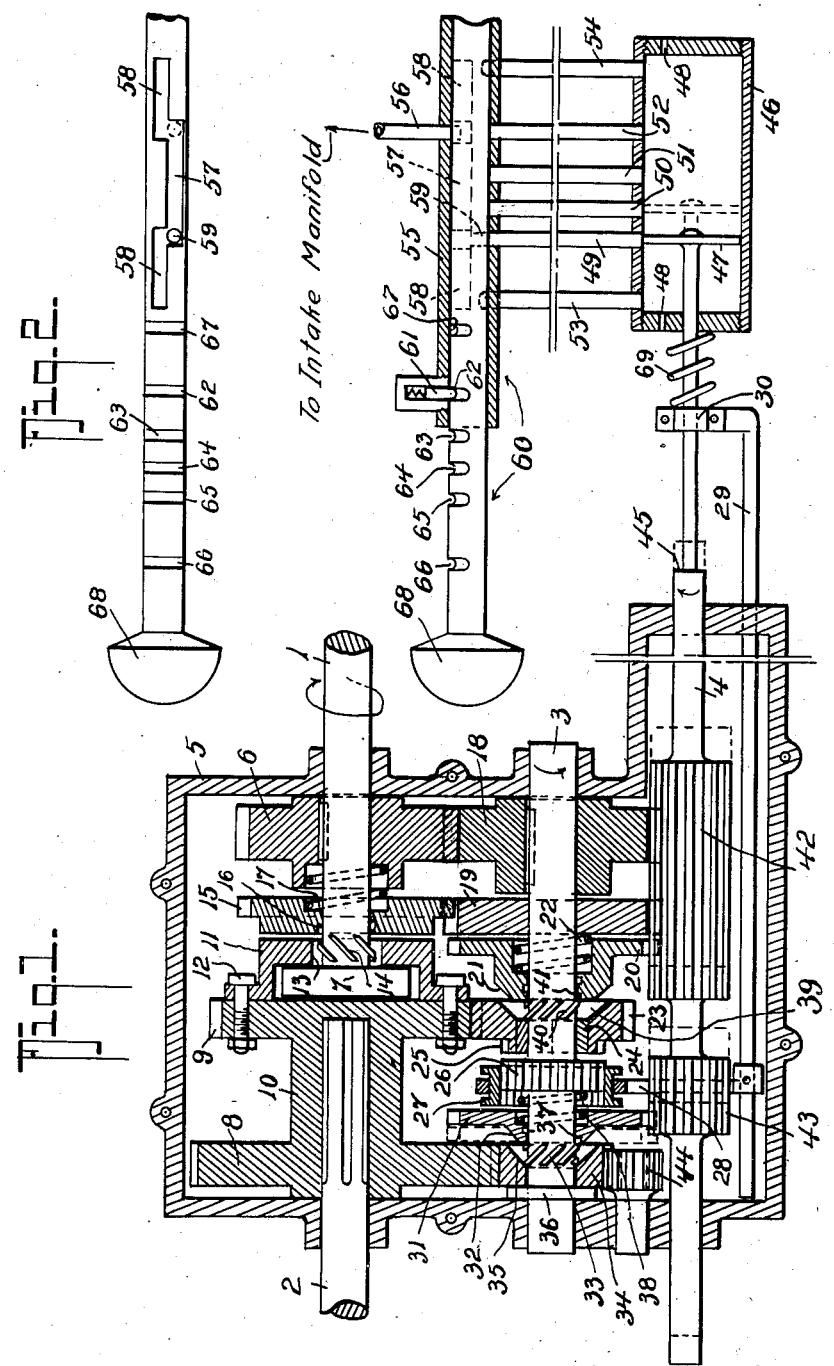
Inventor
Henry A. Smitt
By Dieterich & Rutley
Attorneys.

Patented Oct. 29, 1940

2,219,965

UNITED STATES PATENT OFFICE 2,219,965

TRANSMISSION MECHANISM

Henry A. Smitt, Fort Lewis, Wash.

Application December 23, 1938, Serial No. 247,493

6 Claims. (Cl. 74—337)

My invention relates to certain new and useful improvements in transmission gear mechanisms of the variable speed type and it especially relates to a manually controlled, automatically shifted gear mechanism.

Primarily the invention has for its object to provide a three speed forward and reverse gear mechanism with improved transmission ratio selecting means, powered by the suction or vacuum produced by the engine of a motor vehicle on which the transmission mechanism is employed.

Again, it is an object to provide a transmission mechanism ratio selector whose operation may be readily controlled by a simple shiftable valve device operated or set by the driver of the vehicle to effect the selection of the particular ratio desired.

Again, it is an object of the invention to provide a selective speed gear mechanism, operated by suction and speed-controlled automatic clutch elements under control of a hand valve key whereby gear ratio changes may be effected quickly, easily and silently.

A further object is to provide a transmission of the character stated in which the driving shaft and the propeller shaft may be positively connected so that the engine may act as a brake when desired.

Other objects will in part be obvious and in part be pointed out.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:

Fig. 1 is a section showing the invention in a somewhat diagrammatic manner so far as the control valve is concerned.

Fig. 2 is a top plan view of the control valve proper.

In the drawing, in which like numbers of reference indicate like parts in both figures, 1 is the driving or first-motion shaft, 2 the driven shaft, 3 the counter-shaft, 4 the control or third shaft, and 5 the gear case.

Keyed to the shaft 1 is a driving gear 6 which meshes with a gear 18 keyed to shaft 3. The gears 6 and 18 are of the same size, i. e., number of teeth, and effect a continuous drive between shafts 1 and 3.

On the inner end of shaft 1 is fixed a clutch disc 7, adjacent which are spiral keys 14 whose purpose will presently appear.

Held on the end of the shaft 2, to turn always with it, is a duplex gear member 10 having a gear 8 of large diameter and a gear 9 of smaller diameter suitably spaced apart. The gear 9 lies adjacent clutch disc 7 and there is secured to gear 9, as at 12, a clutch member 11. The member 11 has an opening 13 to clear the keys 14 which project beyond the plane of the outer face of member 11 so as to be capable of being engaged at times in the spiral grooves 16 of a gear 15 loose on shaft 1 and continuously pressed toward clutch member 11 by a spring 17.

The gear 15 meshes (somewhat loosely) with a gear 19 loose on shaft 3. The gears 6, 18 and 19 are of the same size, while gear 15 is slightly smaller (for example, gears 6, 18 and 19 may each have 100 teeth, while gear 15 has, say, 98 teeth, the reason for which will soon appear).

Mounted loosely on shaft 3 and adjacent gear 19 is a gear 20. This gear is of the same size as gear 15. The gear 20 has a clutch face (cone) 21 and a spiral groove 41, and is continuously urged away from gear 19 by a spring 22. The gear 20 is designed to have its clutch face 21 cooperate with a complementary clutch face 39 on a gear 23, also mounted to turn on shaft 3 and held against substantial axial movement by the spiral keys 40, on one side, and the toothed disc 26 which is fast on shaft 3 on the other side. The gear 23 is mounted on shaft 3 via a split ring 24 pressed into the hub of the gear 23. The gear 23 has a shoulder which is provided with a toothed periphery 25 of the same diameter and number of teeth as disc 26.

An axially slidable toothed collar 27 fits on toothed disc 26 and may be shifted to teeth 25 also to connect gear 23 to turn with shaft 3. The collar 27 has a peripheral groove in which the collar shifter arm 28 lies in part. A rod 29 carries arm 28 and projects through an opening in the case 5 and has a bearing extension 30 to fit on a reduced portion of shaft 4 which carries the piston 47 that works in a cylinder 46.

A second slidable gear 31 runs loosely on shaft 3 to which it is designed to be connected to turn by means of spiral shaft keys 33 and groove 37 when engaged. The gear 31 has a cone clutch portion 32 to cooperate with the clutch face 35 of a gear 34 which is mounted to turn freely on shaft 3 between keys 33 and a collar 36 on shaft 3. The gear 31 has spiral grooves 37 to receive keys 33 when engaged and a spring 38 continuously tends to effect such engagement.

The gear 34 continuously meshes with gear 8 and with a reversing pinion 44 suitably mounted in the case at a fixed place.

The gears 15, 31 and 20 are all of the same size.

The control shaft has a long gear 42 and a short gear 43 spaced apart. The long gear meshes with gears 18, 19 and 20 only, while gear 43 may be caused to mesh with gear 44, or with gears 20 and 19.

An abutment 45 on shaft 4 serves to engage extension 30 at times to carry rod 29 along with shaft 4 in shifting to the engine-brake position, against the tension of a spring 69.

The cylinder 46 has pressure-equalizing holes 48 in its ends which are to be made small enough so as not to weaken substantially the vacuum or suction force acting on the piston 47.

The cylinder 46 has several ports from which pipes 53, 49, 50, 51, 52 and 54 lead to like ports in the casing of a control valve 60.

The casing 55 also has a duct 56 leading from the suction side of the engine (intake manifold), not shown.

The valve proper comprises a slidable and rockable rod having a ⌐⌐-shaped duct 57, 58 and a port 59, the latter being designed to register with the ports leading to the respective pipes 49 to 54 inclusive. The valve proper has a set of notches 66, 65, 64, 63, 62 and 67 respectively corresponding to pipes (ducts) 53, 49, 50, 51, 52, 54 and cooperating with a spring-pressed latch 61. A knob 68 on the valve proper enables it to be pulled out or pushed in as desired.

The pipe 56 projects into the slot 58—57—58 (Fig. 2) a distance sufficient to act also as a finger to keep the valve proper from being pulled out or pushed in too far, or turned on its axis too far.

Operation

Assume the parts to be located as in Fig. 1, and shaft 1 turning. This is the neutral position. In this position, with gear 43 meshed with gear 31, and gear 42 meshed with gears 20 and 19, gears 15, 20 and 31 will revolve with angular velocities that are greater than the angular velocities of the shafts upon which they are mounted, and consequently the gears will remain free from the spiral keys and consequently no drive is given to the propeller shaft 2.

To shift to low forward speed, the operator pushes button 68 in until notch 63 is engaged by latch 61 at which time port 59 will register with duct 50 and piston 47 will be pulled over to the position shown in dotted lines in Fig. 1. This causes gear 43 to unmesh with gear 31; the excess velocity which gear 31 has over that of the shaft 3 is soon lost and the internal grooves 37 of the gear 31 engage the spiral keys 33 and, aided by spring 38, the gear moves axially along the shaft until it frictionally clutches gear 34 to revolve it, and consequently to drive the propeller shaft.

When the valve key is pushed in farther, until notch 64 is engaged by latch 61, port 59 will be brought into register with duct 51 and piston 47 will be drawn over accordingly. This will bring ager 42 out of mesh with gear 20, permitting gear 20 frictionally to clutch and revolve gear 23 and consequently to drive the propeller shaft 2 to give intermediate speed.

When shift valve knob 68 is moved until notch 65 is engaged by latch 61, port 59 will register with duct 52 and piston 47 will be drawn over accordingly. This causes gear 42 to become unmeshed from gear 19; this permits gear 15, aided by disc 7, to clutch element 11 between 7 and 15 and thereby lock shafts 1 and 2 together to turn as one. This is the high-speed position.

To use the compression of the engine as a brake, the operator turns the valve key clockwise at high position, and then moves it in to bring notch 66 to latch 61. This brings port 59 in register with duct 54. When piston 47 moves from high-speed position about half way toward duct 54, the gear 43 will be meshed with gear 19 to cause gear 15 to become disengaged from 11 by reason of the fact that gear 15 will now have an angular velocity greater than that of the driving shaft upon which the gear 15 is mounted. The abutment 45 of shaft 4 will now have contacted extension 30 of rod 29 and the remainder of the movement of shaft 4 to the right (until piston 47 lines up with duct 54) will shift collar 27 to connect member 26 to member 25, thus giving a drive from shaft 2 via gears 9 and 23, shaft 3, and gears 18 and 6 to shaft 1.

Reverse is had by turning valve key at neutral position clockwise and then pulling it out until latch 61 enters notch 67. This brings port 59 in register with duct 53 and moves piston 47 to the left in register with duct 53. This movement of the piston 47 brings gear 43 in mesh with gear 44.

Although the shift from one ratio to another is made progressively, yet, due to the fact that the linear peripheral speeds of the gears on the second and third shafts (3 and 4) are nearly equal, any ratio can be had easily, quickly and silently.

The shape of the slot 58, 57, 58 is necessary as a precautionary measure against having the transmission thrown into reverse should the motorist, under stress, quickly move the shift valve key to the neutral position.

From the foregoing description, taken in connection with the accompanying drawing, it is thought that the complete construction, operation and advantages of the invention will be clear to those skilled in the art to which it relates.

What I claim is:

1. In power transmission gearing of the three speed forward, reverse type employing a primary driving gear and a final driven gear and shiftable power transmitting connections between said primary and final gears; the combination with the aforesaid gears and power transmitting connections of means to affect the power transmission connections to effect the changes in the speed ratios between said driving and driven gears, said means including a control shaft in operative connection with said power transmitting connections to be continuously rotated, means to mount said shaft for axial shiftability to different positions, depending on the particular gear-ratios desired, and means for shifting said control shaft to its different positions.

2. In power transmission gearing of the three speed forward, reverse type employing a primary driving gear and a final driven gear and shiftable power transmitting connections between said primary and final gears; the combination with the aforesaid gears and power transmitting connections of means to affect the power transmission connections to effect the changes in the speed ratios between said driving and driven gears, said means including a control shaft in operative connection with said power transmitting connections to be continuously rotated at a fixed ratio with respect to said primary driving gear, means to mount said shaft for axial shiftability to different positions, depending on the particular gear-ratios desired, and means for shifting said control shaft to its different positions.

3. In power transmitting mechanism, a casing, a driving shaft and a propeller shaft journalled in said casing, a primary driving gear fixedly secured to said driving shaft, a second gear rotatably and axially shiftably mounted on said driving shaft, said second gear having a clutch face, a clutch disc rigidly secured to said driving shaft, a clutch plate carried by said propeller shaft and located between said clutch disc and said clutch face, means operated by rotation of said driving shaft for drawing said second gear toward said clutch disc to effect a direct-drive connection between said driving and propeller shafts, a counter-shaft, a gear fast on said counter-shaft and meshing continuously with said primary driving gear, a second gear rotatably mounted on said counter-shaft and continuously meshing with said second gear on said driving shaft, a third gear rotatably and axially shiftably mounted on said counter-shaft, a fourth gear rotatably mounted on said counter-shaft and said third and fourth gears having cooperating clutch faces, a gear on said propeller shaft continuously meshing with said fourth gear, and means operated through rotation of said counter-shaft for causing said third gear to rotate with said counter-shaft and bring the clutch faces of said third and fourth gears together and control devices cooperating with the aforesaid structure for effecting the changes in gear ratios desired.

4. In power transmitting mechanism, a casing, a driving shaft and a propeller shaft journalled in said casing, a primary driving gear fixedly secured to said driving shaft, a second gear rotatably and axially shiftably mounted on said driving shaft, said second gear having a clutch face, a clutch disc rigidly secured to said driving shaft, a clutch plate carried by said propeller shaft and located between said clutch disc and said clutch face, means operated by rotation of said driving shaft for drawing said second gear toward said clutch disc to effect a direct-drive connection between said driving and propeller shafts, a counter-shaft, a gear fast on said counter-shaft and meshing continuously with said primary driving gear, a second gear rotatably mounted on said counter-shaft and continuously meshing with said second gear on said driving shaft, a third gear rotatably and axially shiftably mounted on said counter-shaft, a fourth gear rotatably mounted on said counter-shaft and said third and fourth gears having cooperating clutch faces, a gear on said propeller shaft continuously meshing with said fourth gear, means operated through rotation of said counter-shaft for causing said third gear to rotate with said counter-shaft and bring the clutch faces of said third and fourth gears together, a fifth gear rotatably and axially movably mounted on said counter-shaft and having a clutch face, a sixth gear with a clutch face rotatably mounted on said counter-shaft, another gear on said propeller shaft continuously meshing with said fifth gear, means operated through rotation of said counter-shaft for causing said fifth gear to rotate with said counter-shaft, a reversing pinion meshing with said fifth gear, and a control shaft having gear elements for cooperative connection with the first, second, third and fifth gears on said counter-shaft and continuously connected to the first gear on said counter-shaft for effecting changes in the gear-ratios between the driving and propeller shafts, said first gears on said driving and counter-shafts being of the same size, said second gear on said driving shaft and said third and fifth gears on said counter-shaft all being of one size and of slightly smaller size than said first gears, means continuously tending to move said last-mentioned three gears in their clutching directions, and means to shift said control shaft to effect the changes in gear-ratios desired.

5. In power transmitting mechanism, a casing, a driving shaft and a propeller shaft journalled in said casing, a primary driving gear fixedly secured to said driving shaft, a second gear rotatably and axially shiftably mounted on said driving shaft, said second gear having a clutch face, a clutch disc rigidly secured to said driving shaft, a clutch plate carried by said propeller shaft and located between said clutch disc and said clutch face, means operated by rotation of said driving shaft for drawing said second gear toward said clutch disc to effect a direct-drive connection between said driving and propeller shafts, a counter-shaft, a gear fast on said counter-shaft and meshing continuously with said primary driving gear, a second gear rotatably mounted on said counter-shaft and continuously meshing with said second gear on said driving shaft, a third gear rotatably and axially shiftably mounted on said counter-shaft, a fourth gear rotatably mounted on said counter-shaft and said third and fourth gears having cooperating clutch faces, a gear on said propeller shaft continuously meshing with said fourth gear, means operated through rotation of said counter-shaft for causing said third gear to rotate with said counter-shaft and bring the clutch faces of said third and fourth gears together, a fifth gear rotatably and axially movably mounted on said counter-shaft and having a clutch face, a sixth gear with a clutch face rotatably mounted on said counter-shaft, another gear on said propeller shaft continuously meshing with said fifth gear, means operated through rotation of said counter-shaft for causing said fifth gear to rotate with said counter-shaft, a reversing pinion meshing with said fifth gear, a control shaft having gear elements for cooperative connection with the first, second, third and fifth gears on said counter-shaft and continuously connected to the first gear on said counter-shaft for effecting changes in the gear-ratios between the driving and propeller shafts, said first gears on said driving and counter-shafts being of the same size, said second gear on said driving shaft and said third and fifth gears on said counter-shaft all being of one size and of slightly smaller size than said first gears, means continuously tending to move said last-mentioned three gears in their clutching directions, means to shift said control shaft to effect the changes in gear-ratios desired, and means to effect a positive gear connection between said counter-shaft and said propeller shaft while the afore-mentioned three equal-sized gears are idling.

6. In power transmitting mechanism, a casing, a driving shaft and a propeller shaft journalled in said casing, a primary driving gear fixedly secured to said driving shaft, a second gear rotatably and axially shiftably mounted on said driving shaft, said second gear having a clutch face, a clutch disc rigidly secured to said driving shaft, a clutch plate carried by said propeller shaft and located between said clutch disc and said clutch face, means operated by rotation of said driving shaft for drawing said second gear toward said clutch disc to effect a direct-drive connection between said driving and propeller shafts, a counter-shaft, a gear fast on said counter-shaft and meshing continuously with said primary driving gear, a second gear rotatably mounted on said counter-shaft and continuously meshing with said second gear on said driving shaft, a third gear rotatably and axially shiftably mounted on said counter-shaft, a fourth gear rotatably mounted on said counter-shaft and said third and fourth gears having cooperating clutch faces, a gear on said propeller shaft continuously meshing with said fourth gear, means operated through rotation of said counter-shaft for causing said third gear to rotate with said counter-shaft and bring the clutch faces of said third and fourth gears together, a fifth gear rotatably and axially movably mounted on said counter-shaft and having a clutch face, a sixth gear with a clutch face rotatably mounted on said counter-shaft, another gear on said propeller shaft continuously meshing with said fifth gear, means operated through rotation of said counter-shaft for causing said fifth gear to rotate with said counter-shaft, a reversing pinion meshing with said fifth gear, a control shaft having gear elements for cooperative connection with the first, second, third and fifth gears on said counter-shaft and continuously connected to the first gear on said counter-shaft for effecting changes in the gear-ratios between the driving and propeller shafts, said first gears on said driving and counter-shafts being of the same size, said second gear on said driving shaft and said third and fifth gears on said counter-shaft all being of one size and of slightly smaller size than said first gears, means continuously tending to move said last-mentioned three gears in their clutching directions, means to shift said control shaft to effect the changes in gear-ratios desired, and means to effect a positive gear connection between said counter-shaft and said propeller shaft while the aforementioned three equal-sized gears are idling, said last named means comprising a toothed portion on said fourth gear, a toothed disc fixed on said counter-shaft and a shiftable toothed collar for connecting said toothed disc to said toothed portion, and a collar shifter rendered operative by said control shaft.

HENRY A. SMITT.